Nov. 5, 1935.    A. G. SIEGFRIED    2,019,696
SHOE PRESS
Filed June 19, 1934
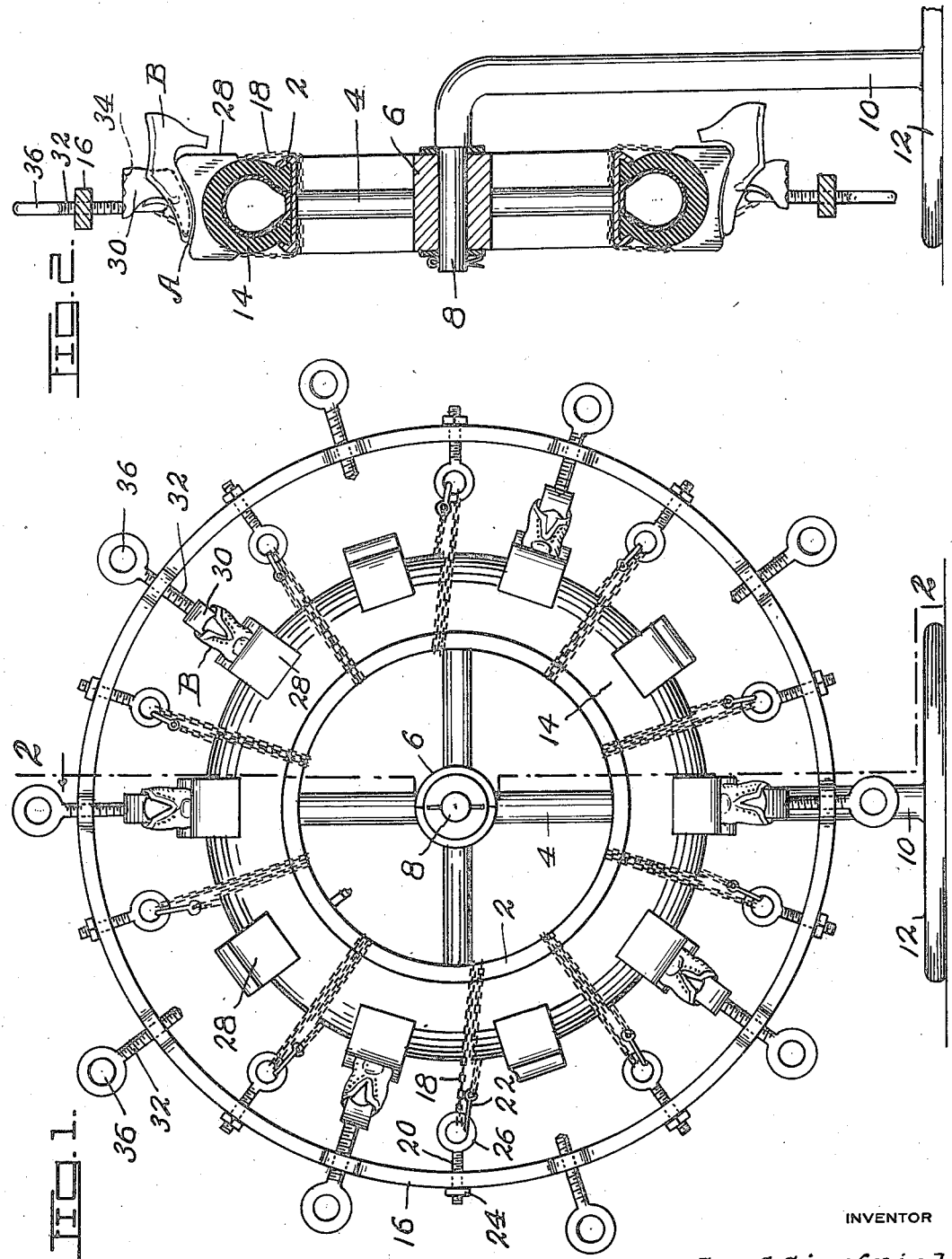
INVENTOR
Alexander G. Siegfried,
BY
F. G. Fischer,
ATTORNEY.

Patented Nov. 5, 1935

2,019,696

UNITED STATES PATENT OFFICE 2,019,696

SHOE PRESS

Alexander G. Siegfried, Kansas City, Mo.

Application June 19, 1934, Serial No. 731,227

7 Claims. (Cl. 12—37)

My invention relates to a press intended more especially for use by shoe repairmen in welding soles on shoes by the cement procedure and my principal object is to provide a press of this character having maximum capacity for the limited space which it occupies.

Another object is to provide a press of this character which is comparatively inexpensive to manufacture and is convenient for use by shoe repairmen in resoling men's, ladies' and children's shoes.

Important features of the invention reside in rotary means equipped with a series of pressing units for pressing the soles on the shoes, and in order that the invention may be fully understood, reference will now be had to the accompanying drawing, in which:

Fig. 1 is a side elevation of a press made in accordance with my invention.

Fig. 2 is an irregular vertical sectional view of the press on line 2—2 of Fig. 1.

In carrying out the invention I employ rotatable supporting means shown in the present instance in the form of a wheel preferably comprising a rim 2 equipped with a suitable number of spokes 4 radiating from a hub 6 rotatably mounted upon an axle 8 projecting from a supporting member 10 having a base 12 which may be firmly secured to the floor of the shop by means of screws, bolts or other suitable fastening means, not shown. Preferably, the wheel is vertically disposed as shown on the drawing, although it might be used if operably-supported in a horizontal plane.

14 designates annular cushioning means suitably mounted upon the rim 2 and preferably comprising a pneumatic type of tire somewhat similar to those used on automotive vehicles.

16 designates a ring extending around the tire 14 and held in concentric relation thereto by suitable means such as a series of chains or cables 18 and tensioning means 20, which latter are preferably in the form of eye-bolts. As shown more particularly by Fig. 1 the chains or cables 18 are wrapped one or more times around the rim 2 and the tire 14 and each has one end permanently attached to the associated tensioning means 20 and its other end equipped with fastening means preferably in the form of a hook 22 for detachably engaging the tensioning means 20. Each tensioning means 20 consists preferably of an eye-bolt extending through the ring 16 and provided at its outer end with a nut 24 which bears against the outer surface of the ring 16 and is adapted when rotated in the proper direction to adjust the eye-bolt outwardly for the purpose of tensioning the chain or cable 18, the ends of which are attached to the eye 26 of said eye-bolt.

Referring now more particularly to the units 5 for pressing the cement coated soles A upon the shoes B it will be noted, on referring to Fig. 1, that said units are arranged alternately with the cables 18 and the eye bolts 20. Each unit comprises a pad 28, a shoe last 30 and a pressure device 32. The pad 28 consists preferably of solid rubber concaved at its inner side to snugly fit the transverse as well as the longitudinal curvature of the tire 14 upon which it is cemented or otherwise fixedly-mounted. The outer surface of the pad 28 is curved to fit the contour of the under side of the shoe B so that the pressure will be equally distributed over the sole A when applied to the shoe.

The shoe last 30 may be of any well-known type having one or more recesses 34 in its upper side and any one of which is adapted to receive the conical inner end of the associated pressure device 32 which consists preferably of a set screw threaded in the ring 16 and provided at its outer end with an eye 36 which constitutes a handle whereby said set screw may be rotated to screw it inwardly or outwardly as desired.

It is believed that the operation of the press is obvious to those skilled in the art but it may be added that in practice when a repairman desires to apply a resole to a shoe he places a shoe last 30 in said shoe and then places the latter with a cement coated resole against its under side upon the uppermost pad 28. Pressure is then applied to the last to weld the resole to the shoe, by rotating the set screw 32 in the proper direction. The foregoing operation may be repeated until all or any desired number of the pressure units are in use, it being understood that the wheel is rotated the space of a unit each time a shoe and its resole are placed in position.

From the foregoing description it is apparent that I have provided a press having large capacity for the limited floor space which it occupies, and while I have shown one embodiment of said press I reserve all rights to such other forms and modifications thereof as properly fall within the spirit and scope of the invention as claimed.

Having thus described my invention, what I claim and desire to secure by Letters Patent, is:

1. A press for welding soles to foot-gear comprising a rotatable rim suitably supported, a tire mounted upon said rim, means spaced around said tire to provide seats for the foot-gear, a ring encircling said tire and arranged to rotate therewith, and pressure exerting means mounted on said ring and adapted to cooperate with the seats in welding soles upon the foot-gear.

2. A press for pressing cement coated soles to shoes comprising a rotatable rim suitably supported, a tire mounted upon said rim, means spaced around said tire to provide seats for shoes, a ring encircling said tire and arranged to rotate therewith, cables connected to the rim, and tensioning means for said cables carried by the ring for holding the latter in concentric relation to the tire, and pressure exerting means mounted on said ring and adapted to cooperate with the seats in pressing soles upon the shoes.

3. A press for welding soles to shoes comprising a rotatable rim suitably supported, a tire mounted upon said rim, means spaced around said tire to provide seats for shoes, a ring spaced from but encircling said tire and arranged to rotate therewith, cables connected to the rim, tensioning means for said cables carried by the ring for holding the latter in concentric relation to the tire, and threaded elements adjustably engaging the ring and adapted to press against the outer ends of lasts inserted in the respective shoes.

4. In a press for welding soles to foot-gear, suitably supported rotatable means, an annular flexible member mounted upon said rotatable means and adapted to support the foot-gear, and pressure exerting means spaced around said annular flexible member and adapted to cooperate therewith in welding soles to the foot-gear.

5. In a press for welding soles to foot-gear, suitably supported rotatable means, an annular pneumatic member mounted upon said rotatable means and adapted to support the foot-gear, and pressure exerting means spaced around said annular pneumatic member and adapted to cooperate therewith in welding soles to the foot-gear.

6. In a press for welding soles to foot-gear, suitably supported rotatable means, a tire mounted upon said rotatable means and adapted to support the foot-gear, and pressure exerting means spaced around said tire and adapted to cooperate therewith in welding soles to the foot-gear.

7. In a press for attaching soles to foot-gear, a stationary support having an axis, a rotatable member journaled upon said axis, a pneumatic tire mounted upon said rotatable member and adapted to support the foot-gear, and manually controlled pressure exerting mechanism spaced around said tire and adapted to coact therewith in attaching soles to the foot-gear.

ALEXANDER G. SIEGFRIED.